United States Patent
Seok et al.

(10) Patent No.: US 9,510,207 B2
(45) Date of Patent: *Nov. 29, 2016

(54) METHOD AND APPARATUS FOR MULTI-CHANNEL OPERATION IN WIRELESS LOCAL AREA NETWORK SYSTEM

(71) Applicant: LG ELECTRONICS INC., Seoul (KR)

(72) Inventors: Yong Ho Seok, Gyeonggi-do (KR); Eun Sun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,413

(22) Filed: Jun. 17, 2014

(65) Prior Publication Data

US 2014/0321379 A1    Oct. 30, 2014

Related U.S. Application Data

(63) Continuation of application No. 13/576,203, filed as application No. PCT/KR2010/007384 on Oct. 26, 2010, now Pat. No. 8,787,292.

(60) Provisional application No. 61/300,032, filed on Feb. 1, 2010.

(30) Foreign Application Priority Data

Jun. 28, 2010  (KR) .......................... 10-2010-0061283

(51) Int. Cl.
*H04W 16/14*        (2009.01)
*H04W 72/04*        (2009.01)
(Continued)

(52) U.S. Cl.
CPC ......... *H04W 16/14* (2013.01); *H04W 72/0493* (2013.01); *H04W 74/006* (2013.01); *H04W 74/0808* (2013.01); *H04W 84/12* (2013.01)

(58) Field of Classification Search
CPC  H04W 16/14; H04W 72/0493; H04W 84/12
USPC .......................................................... 370/329
See application file for complete search history.

(56) References Cited

U.S. PATENT DOCUMENTS 6,795,689 B1 *  9/2004  Ogren ................... H04W 24/00
                                                        370/331
7,079,507 B2 *  7/2006  Toskala et al. ............... 370/329
(Continued)

FOREIGN PATENT DOCUMENTS

KR    10-2007-0106351 A    11/2007
KR    10-2009-0119349 A    11/2009
(Continued)

OTHER PUBLICATIONS

International Search Report issued in corresponding International Application No. PCT/KR2010/007384 dated Jul. 13, 2011.

(Continued)

*Primary Examiner* — Rasheed Gidado
(74) *Attorney, Agent, or Firm* — Morgan, Lewis & Bockius LLP (57) ABSTRACT

Disclosed are a method and apparatus for multi-channel operation, performed by an access point (AP), in a WLAN system, the method includes: transmitting channel assignment information to a plurality of stations (STAs), in which the channel assignment information is for assigning at least one of a first channel and a second channel to each of the plurality of STAs; transmitting channel activity information to the plurality of STAs, in which the channel activity information is for indicating an activity duration where the AP transmit or receive a frame through each of the first channel and the second channel; and transmitting or receiving a frame through the first channel or the second channel on the basis of the channel activity information.

4 Claims, 6 Drawing Sheets

(51) Int. Cl.
*H04W 74/00* (2009.01)
*H04W 74/08* (2009.01)
*H04W 84/12* (2009.01)

(56) References Cited

U.S. PATENT DOCUMENTS

| | | | |
|---|---|---|---|
| 7,079,523 B2* | 7/2006 | Nelson et al. | 370/342 |
| 7,218,621 B2* | 5/2007 | Lee | 370/335 |
| 7,426,399 B2 | 9/2008 | Ishii et al. | |
| 7,457,620 B2 | 11/2008 | Lam et al. | |
| 7,526,399 B2* | 4/2009 | Matsumoto et al. | 702/125 |
| 8,081,972 B2* | 12/2011 | Chan et al. | 455/434 |
| 8,477,738 B2* | 7/2013 | Hole et al. | 370/336 |
| 8,619,683 B2* | 12/2013 | Shan et al. | 370/329 |
| 2003/0220112 A1* | 11/2003 | Bugeja | 455/446 |
| 2005/0113100 A1* | 5/2005 | Oprescu-Surcobe et al. | 455/450 |
| 2008/0112380 A1* | 5/2008 | Fischer | 370/338 |
| 2008/0227403 A1* | 9/2008 | Taki | 455/68 |
| 2009/0061783 A1 | 3/2009 | Choi et al. | |
| 2010/0246517 A1* | 9/2010 | Pradas | H04W 72/0413 370/329 |
| 2011/0096747 A1* | 4/2011 | Seok | 370/329 |
| 2011/0116458 A1 | 5/2011 | Hsu et al. | |
| 2011/0164583 A1 | 7/2011 | Kim | |

FOREIGN PATENT DOCUMENTS

| | | |
|---|---|---|
| KR | 10-2009-0120518 A | 11/2009 |
| WO | 2008/114216 A | 9/2008 |

OTHER PUBLICATIONS

Kondo et al., "Technology for WiFi/Bluetooth and WiMAX Coexistence," FUJITSU Sci. Tech. J. vol. 46, No. 1 (Jan. 2010), pp. 72-78.

\* cited by examiner

METHOD AND APPARATUS FOR MULTI-CHANNEL OPERATION IN WIRELESS LOCAL AREA NETWORK SYSTEM

CROSS REFERENCE TO RELATED APPLICATIONS

The present application is a continuation of U.S. patent application Ser. No. 13/576,203, filed on Sep. 13, 2012, the entire disclosure of which is hereby incorporated by reference for all purposes as if fully set forth herein. U.S. patent application Ser. No. 13/576,203 is a U.S. national stage of PCT International Application No. PCT/KR2010/007384, filed on Oct. 26, 2010, and claims the benefit of U.S. Provisional Application No. 61/300,032, filed on Feb. 1, 2010. The national stage application also claims the benefit of Korean Patent Application No. 10-2010-0061283, filed on Jun. 28, 2010.

TECHNICAL FIELD

The present invention relates to a wireless local area network (WLAN) system, and more particularly, to a method and apparatus for multi-channel operation in a WLAN system.

BACKGROUND ART

There are frequency bands that can be shared by other kinds of wireless communication systems, one of which is a television white space (TV WS). The TV WS is an idle frequency band remained as an analog TV becomes digitalized, and this band corresponds to a spectrum of 54~698 MHz assigned for TV broadcasting. If a licensed device having priority to use a relevant frequency domain does not use this frequency band, an unlicensed device can use this frequency band.

If the IEEE 802.11 is applied to the TV WS, there is an advantage that coverage is noticeably extended due to the spectrum characteristics of the TV WS. However, in general, if the coverage is extended, the number of STAs within the coverage is definitely increased. As the number of STAs increases, a method for flexibly managing users, i.e., scalability becomes an object of concern. Further, since various wireless communication systems and various unlicensed devices coexist, a problem of coexistence occurs. If distributed coordination function (DCF) and enhanced distributed cannel access (EDCA) protocols of IEEE 802.11 are applied to this environment, the problem of scalability may grow worse.

The DCF is a channel access mechanism used in IEEE 802.11 and based on carrier sense multiple access/collision avoidance (CSMA/CA). Also, the EDCA corresponds to a competition-based medium access method among channel access models proposed in a hybrid coordination function (HCF) provided by extension of a general medium access control protocol. The HCF is a protocol provided by IEEE 802.11e proposed to guarantee quality of service (QoS).

Further, if an IEEE 802.11 protocol is applied to the TV WS, it is expected that overlapping base service sets (BSSs) are rapidly increased. For example, if a user voluntarily installs an access point (AP) supporting the TV WS, coverage of the AP is so large that overlapping zone may increase.

When trying to use the TV WS, an unlicensed equipment utilizes geo-location database to acquire an available channel a corresponding zone. Also, to solve a problem of coexistence between unlicensed equipments, there is a need for a signaling protocol such as a common beacon frame or the like.

A terminal for the IEEE 802.11 TV WS refers to an unlicensed equipment that operates using IEEE 802.11 MAC and PHY in the TV WS. Hereinafter, a station (STA) and AP operating in the TV WS will be called a WS STA and a WS AP, respectively.

The WS STA has to provide a protection function for an incumbent user. That is, if the incumbent user such as a microphone is in of use, the WS STA has to stop the use of a channel for protecting the incumbent user. To this end, the WS STA requires a spectrum sensing mechanism. The spectrum sensing mechanism includes an energy detection method, a signature detecting method, etc. It is determined that the incumbent user is in of use if strength of a received signal is equal to or higher than a certain value, or it is determined that the incumbent user is in of use if a DTV preamble is detected. However, a WS communication mechanism that reflects the incumbent user protection function of a common WS may have troubles in maintaining quality of service and securing reliability since an ascertain and standby time is taken. Accordingly, a more-detailed WS communication mechanism is required to maintain the quality of service and secure the reliability of the WS STA.

SUMMARY OF INVENTION

Technical Problem

The present invention provides a method and apparatus for multi-channel operation of guaranteeing coexistence with other wireless communication systems, in a wireless local area network (WLAN) system.

Solution to Problem

In an aspect of the invention, there is provided a method for multi-channel operation, performed by an access point (AP), in a wireless local area network (WLAN) system. The method includes transmitting channel assignment information to a plurality of stations (STAs), in which the channel assignment information is for assigning at least one of a first channel and a second channel to each of the plurality of STAs; transmitting channel activity information to the plurality of STAs, in which the channel activity information is for indicating an activity duration where the AP transmit or receive a frame through each of the first channel and the second channel; and transmitting or receiving a frame through the first channel or the second channel on the basis of the channel activity information.

Each of the plurality of STAs may perform channel sensing for detecting whether an incumbent user occupies the operation channel in a duration except the activity duration of an operation channel.

The channel activity information may include a channel indicator, an activity offset indicating a point of time when the activity duration first starts for a channel indicated by the channel indicator, a length of the activity duration and an activity interval between the activity durations.

The activity duration may periodically be set, and the channel activity information may further include a set cycle of the activity duration or each interval between the set activity durations.

The channel assignment information and the channel activity information may be transmitted to the plurality of STAs through a probe response frame.

The channel assignment information and the channel activity information may be transmitted through a beacon frame.

The AP may transmit the beacon frame through the first channel, and the STA assigned with the second channel as an operation channel may switch to the first channel and receive the beacon frame through the first channel at a point of time when the beacon frame is transmitted.

The AP may transmit the beacon frame through the first channel, and may transmit a multi-channel information element frame including the channel activity information through the second channel.

The first channel and the second channel may be of a television white space (TV WS) band.

In another aspect of the invention, there is provided a wireless apparatus. The wireless apparatus includes a radio frequency (RF) unit which transmits or receives a frame and a processor which operates while operably connecting with the RF unit.

The processor is set for transmitting channel assignment information to a plurality of stations (STAs), in which the channel assignment information is for assigning at least one of a first channel and a second channel to each of the plurality of STAs, transmitting channel activity information to the plurality of STAs, in which the channel activity information is for indicating an activity duration where the AP transmit or receive a frame through each of the first channel and the second channel and transmitting or receiving a frame through the first channel or the second channel on the basis of the channel activity information.

Advantageous Effects of Invention

In a WLAN system, there are provided a method and apparatus for multi-channel operation, so that efficiency of using a wireless medium can be improved to thereby improve a throughput of a WLAN system and reliability of data transmission.

MODE FOR THE INVENTION

Below, exemplary embodiments of the present invention will be described in detail with reference to accompanying drawings. To easily explain the present invention, a method for multi-channel operation in a wireless local area network (WLAN) system using a band of a television white space (TV WS) and an apparatus supporting the same will be described by way of example. However, the scope of the present invention is not limited thereto, and may be equally applied to a WLAN system operating to be used for multi-channels.

Figure 1:
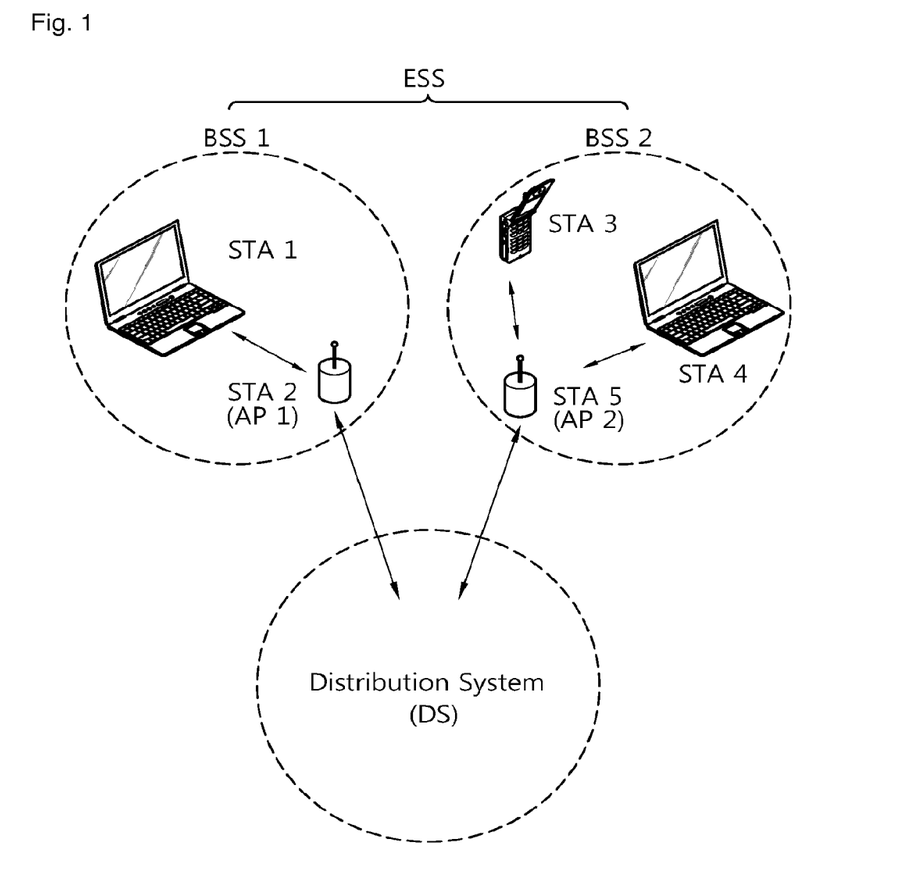
FIG. 1 shows configuration of a wireless local area network (WLAN) system according to an exemplary embodiment of the present invention.

FIG. 1 shows configuration of a wireless local area network (WLAN) system according to an exemplary embodiment of the present invention.

Referring to FIG. 1, the WLAN system includes one or more basic service set (BSS). The BSS is a group of stations (STA) which can successfully synchronize and communicate with one another, and does not mean a certain zone.

An infrastructure BSS (BSS1, BSS2) includes one or more non-access point (AP) STAs (non-AP STA1, non-AP STA2, non-AP STA2); APs (AP STA1, AP STA2) providing distribution service; and a distribution system (DS) connecting the plurality of APs (AP STA1, AP STA2). In the infrastructure BSS, the AP manages the non AP STAs.

On the other hand, an independent BSS (IBSS) is a BSS that operates in an Ad-Hoc mode. Since the IBSS does not include the AP, there is no centralized management entity that performs centralized management. That is, in the IBSS, the non-AP STAs are managed in a distributed manner. In the IBSS, all STAs may be provided as mobile STAs and constitute a self-contained network since access to the DS is not allowed.

A station (STA) is a predetermined functional medium having a medium access control (MAC) and a physical layer interface for a wireless medium, based on institute of electrical and electronics engineers (IEEE) 802.11 standards, which broadly includes both the AP and the non-AP STA. Further, a station operable in a TV WS band (to be described later), i.e., employing this band as a communication channel will be called a WS STA.

Among the stations, a potable terminal manipulated by a user is a non-AP STA: STA1, STA3, STA4 and STA 5, and simply a station may indicate a non-AP station. The non-AP STA may also differently called a terminal, a wireless transmit/receive unit (WTRU), a user equipment (UE), a mobile station (MS), a mobile terminal, a mobile subscriber unit, or the like. Further, a non-AP STA operable in the TV WS band is called a non-AP WS STA or shortly called a WS STA.

Further, the AP (AP1, AP2) is a functional entity that provides access to a distribution system (DS) via a wireless medium for the STA associated with the corresponding AP. In the infrastructure BSS including the AP, communication between the non-AP STAs is basically performed via the AP, but direct communication between the non-AP STAs may be possible if a direct link is set.

The AP may be also called a central controller, a base station (BS), a node-B, a base transceiver system (BTS), a cite controller, or the like. Further, the AP operable in the TV WS band (to be described later) is called a WS AP.

The plurality of infrastructure BSSs may be connected to one another through the distribution system (DS). The plurality of BSSs connected through the DS is called an extended service set (ESS). The STAs included in the ESS can communicate with one another, and the non-AP STAs within one ESS can move from one BSS to another BSS while performing the communication without disconnection.

The DS is a mechanism that enables one AP to communicate with another AP. Through the DS, the AP can transmit a frame for the STAs associated with the BS managed by the AP, transmit a frame when one STA moves to another BSS, or transmit a frame to an external network such as a wired network or the like. The DS is not necessarily a network, but may be achieved without any limitation as long as it can provide predetermined distribution service based on IEEE 802.11. For example, the DS may be a wireless network such as a mesh network, or a physical structure connecting the APs with one another.

The WS STA using the TV WS band has to provide a protection function for a licensed user, the reason of which is because the licensed user has priority in using the corresponding band. The licensed user indicates a user allowed to use the WS band, and may be also called a licensed device, an incumbent user, a primary user, a major user or the like. Hereinafter, these will be commonly called the incumbent user. In the case of the incumbent user (e.g., DTV, microphone, etc.) is already using a certain channel of the WS band, the corresponding channel has not to be available in order to protect the incumbent user.

Therefore, to use a certain channel, the WS AP or the WS STA has to previously undergo a procedure of determining whether the corresponding channel is available, i.e., whether the incumbent user occupies the corresponding channel. The determination of whether the incumbent user is using the corresponding channel, i.e., detection of a signal from the incumbent user occupying the corresponding channel is called spectrum sensing.

The WS AP and the WS STA can use the corresponding channel after ascertaining that the corresponding channel is unoccupied for at least 30 seconds. In other words, it is possible to transmit a signal only after waiting at least 30 seconds even though the channel is unoccupied. Further, the WS STA has to monitor the corresponding channel at least once every 60 seconds, and has to stop transmitting a signal through the use channel within 2 seconds if the signal of the incumbent user is sensed in the corresponding channel. A rule of the channel monitoring or interference avoidance is not only applied to the WS STA but also directly applied to the WS AP FIG. 2 shows an example of a frame transmitting/receiving method of a WLAN system using a channel of a TV WS band to transmit a frame.

Before transmitting a signal, the WS STA or the WS AP trying to use a channel A 210 of the WS band ascertains whether the channel A 210 is idle or not through the spectrum sensing (S211). As a result of the spectrum sensing, if the channel A 210 is not occupied by the incumbent user, i.e., if a signal of the incumbent user is not detected in the channel A 210, the WS STA or the WS AP waits at least 30 seconds (S212). After the spectrum sensing and waiting at least 30 seconds, if the channel A 210 is still unoccupied by the incumbent user, the WS STA or the WS AP transmits/receives a frame through the corresponding channel (S213). Thereafter, the WS STA or the WS AP monitors every 60 seconds whether the signal of the incumbent user is sensed with regard to the channel A 210.

Figure 2:
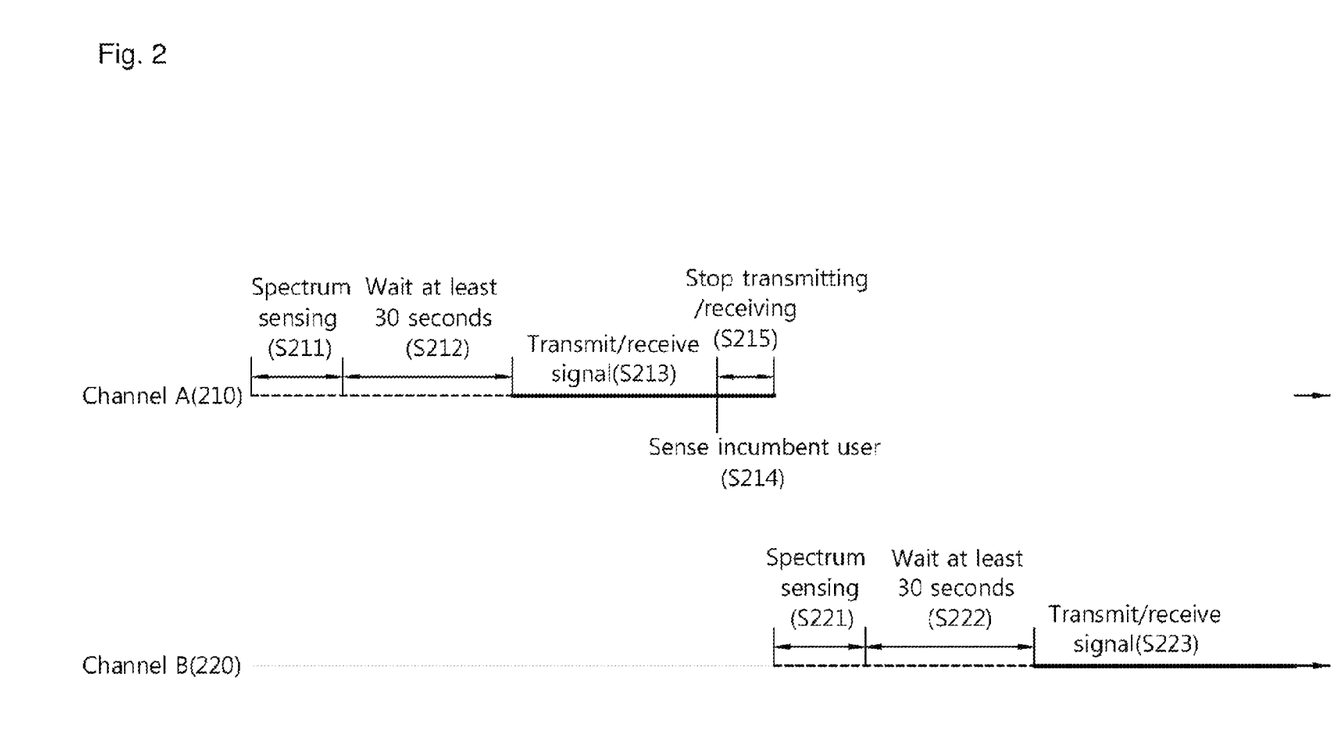
FIG. 2 shows an example of a frame transmitting/receiving method of a WLAN system using a channel of a TV WS band to transmit a frame.

As shown in the example of FIG. 2, if the signal of the incumbent user is sensed as a result of monitoring the channel after 60 seconds (S214), the WS STA or the WS AP stops transmitting/receiving the frame through the channel A 210 within 2 seconds. As the incumbent user occupies the channel A 210, the WS STA or the WS AP that cannot use the channel A 210 performs the spectrum sensing with regard to another channel B 220 in the WS band (S221). Like the foregoing procedures for using the channel A 210, the WS STA or the WS AP can transmit/receive a frame (S223) only after waiting 30 seconds (S222) even though it is ascertained that the channel B 220 is idle.

Through the above method for providing the protection function with regard to the incumbent user, the WLAN system using the channel of the WS band has to switch the use channel in accordance with a change of a channel condition (e.g., an appearance of the incumbent user), and has to perform sensing or the like with regard to a target channel every time when the channel is switched. Accordingly, it is so difficult to continuously transmit/receive the frame that the throughput of the WLAN system may be decreased, the reliability of the frame transmission may be deteriorated, and quality of service may be noticeably lowered.

According to an exemplary embodiment of the present invention, the AP simultaneously operates a plurality of channels and keeps monitoring whether the incumbent user appears in each of the plural channels. If the incumbent user appears in one channel among the plural channels, the AP and the STA can switch to another channel kept being monitored. At this time, the AP and the STA can directly transmit/receive the frame without any standby time due to the channel switching since it is being continuously monitored whether the incumbent user exists in a target channel for the channel switching.

For instance, the TV WS band has a plurality of channels and assigns a bandwidth of 6 MHz for each channel. Thus, the WS AP occupies and operates a plurality of available channels, in which the operation is based on priority given to the respective channels. In practice, only one channel is used for transmitting/receiving the frame, while the other channels undergo the spectrum sensing.

In the WLAN system using the TV WS band according to an exemplary embodiment of the present invention, the frame can be transmitted to/received from the STA operating in each of the plural channels through the plurality of channels. Below, a case of two channels will be described for easily explaining the present invention, but not limited thereto. Alternatively, the present invention may be equally applied to a case where three or more channels are used in transmitting/receiving the frame.

Figure 3:
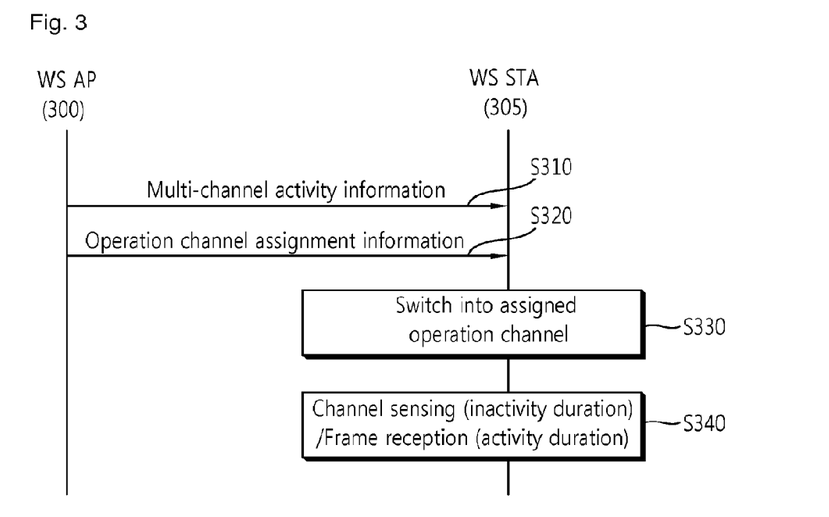
FIG. 3 shows operation of a STA in a WLAN system using a WS band according to an exemplary embodiment of the present invention.

FIG. 3 shows operation of a STA in a WLAN system using a WS band according to an exemplary embodiment of the present invention.

A WS STA 305 receives a multi-channel activity message from a WS AP 300 (S310), and receives an operation channel assignment message (S320).

If the WS AP 300 manages a first channel and a second channel, multi-channel activity information includes information about a period of operating in the first channel and information about a period of operating in the second channel. The WS AP 300 can operate switching between the first channel and the second channel. When the WS AP 300 operates in the first channel, it can be stated that the first channel is active but the second channel is inactive. Likewise, when the WS AP 300 operates in the second channel, it can be stated that the second channel is active but the first channel is inactive. That is, that a certain channel is active indicates that the WS AP operates in the corresponding channel or that a frame exchange is possible between the WS AP and WS STA operating in the corresponding channel.

If a certain channel is inactive, it means that the WS AP does not operate in the corresponding channel and thus the frame exchange is impossible between the WS AP and the WS STA. During an inactive period, the WS STA may continuously monitor (sense) whether the incumbent user appears in the corresponding channel.

In this exemplary embodiment, an activity duration and an inactivity duration of a certain channel may be respectively represented as a frame exchange period and a channel sensing duration in light of operation performed by the WS STA in the respective durations.

Information about the activity/inactivity durations of each channel, determined by the WS AP 310 and transferred to the STA, may be formed based on a regional location of the WS AP 310. The WS AP 310 can know information such as a location of a TV broadcasting station corresponding to the incumbent user, a use pattern, etc. through data base (DB) in advance. Therefore, the WS AP 310 can select a plurality of channels to operate by using the information of the DB, and determine the activity/inactivity durations of the channels, thereby informing the WS STA 305 of that.

In FIG. 3, the operation channel assignment message includes information about the channel that the WS STA 305 will operate. The WS AP 300 may group the STAs associated with the WS AP 300 and assign the channel, where the STA will operate, to the STA, which belongs to the STA group, with regard to each STA group.

The multi-channel activity information and the operation channel assignment information of FIG. 3 may be transmitted to the STA 305 through individual frames, respectively, or transmitted as being included in one frame.

The STA 305 that receives the multi-channel activity message and the operation channel assignment message ascertains information about an operation channel assigned thereto, included in the operation channel assignment message, and switches to the operation channel assigned thereto (S330).

Then, the STA 305 acquires the activity information of the operation channel, where it operates, from the multi-channel activity message, and transmits/receives the frame in the activity duration while performing the spectrum sensing to sense whether the incumbent user using the assigned channel exists in the inactivity duration with respect to the channel where the STA 305 operates (S340).

Figure 4:
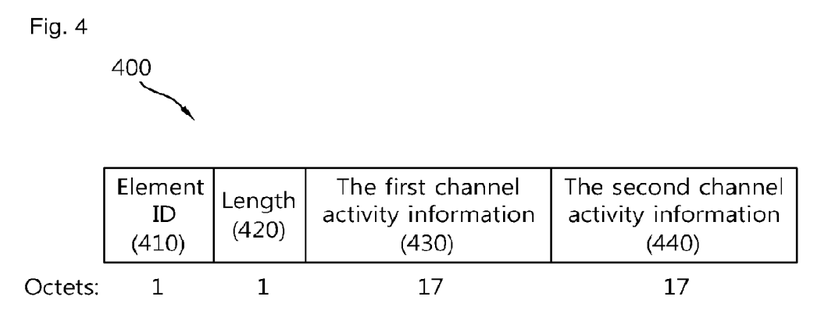
FIG. 4 shows an example of a multi-channel information element format for transmitting multi-channel activity information.

FIG. 4 shows an example of a multi-channel information element format for transmitting multi-channel activity information.

A multi-channel information element 400 includes an element identifier (ID) 410, a length 420, the first channel activity information 430, and the second channel activity information 440.

The element ID field 410 functions as an identifier of the corresponding information element, and the length field 420 indicates the length of the multi-channel information element 400. FIG. 4 shows just an example that two channels, the first channel and the second channel, are under operation. If three or more channels are under operation, channel activity information fields may be added as many as the number of operation channels. In FIG. 4, the length of each field is nothing but an example, which may be varied depending on the sizes of different information added to the corresponding field.

The STA receives a frame containing a multi-channel information element, and exchanges the frame with the AP in the activity duration of the channel by referring to the activity information field of the channel corresponding to the operation channel assigned thereto in the multi-channel information element, thereby sensing the operation channel in the inactivity duration.

Figure 5:
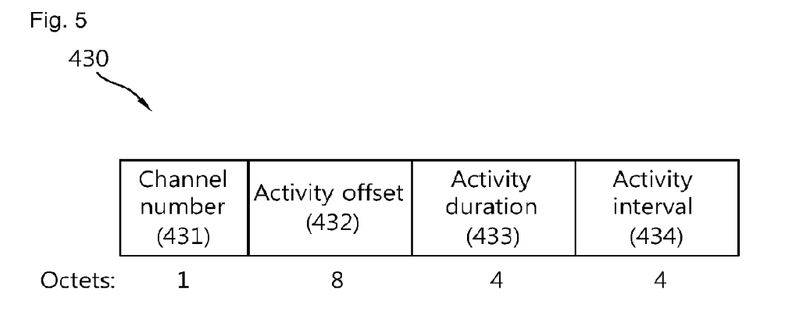
FIG. 5 is a block diagram showing an example of a configuration of a channel activity information field.

FIG. 5 is a block diagram showing an example of a configuration of a channel activity information field.

The channel activity information 430 includes a channel number 431, an activity offset 432, an activity duration 433 and an activity interval 434. The channel number 431 is used for distinguishing which channel the channel activity information 430 relates to, and the activity offset 432 indicates a point of time when the first activity duration of the corresponding channel starts. The activity duration 433 indicates a length of time corresponding to the first activity duration of the corresponding channel, and the activity interval 434 indicates an interval between the activity durations, i.e., a value corresponding to the inactivity duration.

The WS STA acquires the activity information of the first and second channels through the multi-channel information element 400 transmitted as being included in a probe request frame or a beacon frame. In the case of the first channel, it is possible to grasp which channel the channel activity information relates to on the basis of the channel number 431 included in the first channel activity information 430. Further, it is possible to start transmitting/receiving the frame of the corresponding channel by grasping a start time of the active period on the basis of the activity offset 432. Then, the frame is transmitted/received during a period indicated by the activity duration 433, and if the active period is terminated, channel sensing is performed by recognizing the inactivity duration up to a point of time indicated by the activity interval 434.

According to an exemplary embodiment of the present invention, the channel activity information may be transmitted as being included in a probe response frame transmitted from the WS AP to the WS STA in response to a probe request frame transmitted for scanning the neighbor BSS at an early stage that the WS STA accesses a network. Also, the channel activity information may be transmitted as being included in a beacon frame if there is a need for transmitting the channel activity information again as the activity information is changed during communication. At this time, the probe response frame or the beacon frame may contain the multi-channel information element of FIG. 4.

The beacon frame is a frame periodically transmitted by the WS AP, which can carry changed activity information if the activity information of the channel is changed. That is, the WS AP may transmit the changed channel activity information to the WS STA as being included in the beacon frame only if the channel activity information is changed, or may periodically transmit the latest channel activity information as being included in the beacon frame.

According to an exemplary embodiment of the present invention, the WS AP may transmit only the channel activity information about the channel assigned to the corresponding WS STA, but may transmit the channel activity information about unassigned channels for quick channel switching when sensing the signal of the incumbent user. A plurality of channel activity information is transmitted at once as being included in the multi-channel information element and the channel activity information may include various information such as a channel number, an activity duration, etc.

Figure 6:
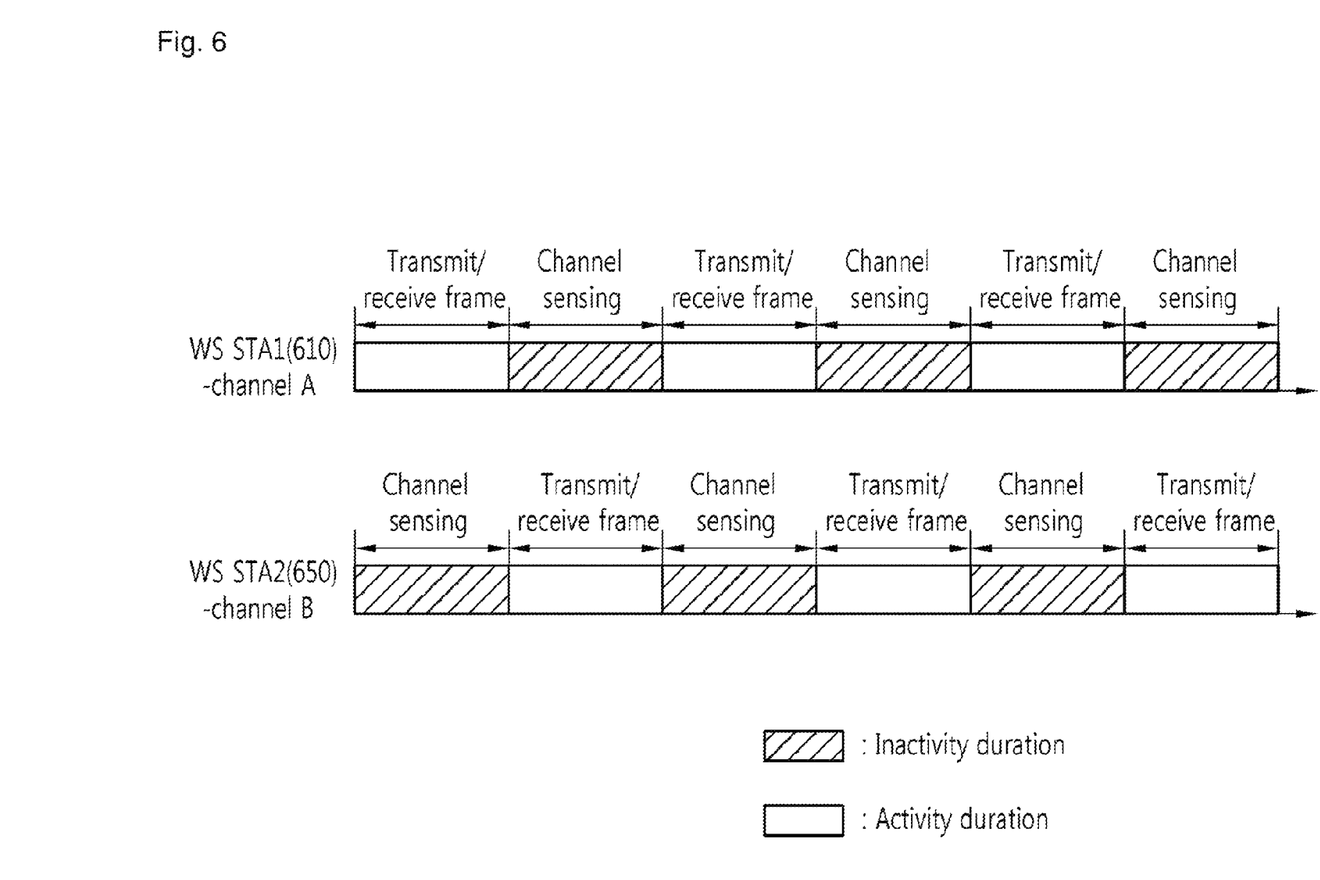
FIG. 6 shows operation of a WS STA in each channel according to an exemplary embodiment of the present invention.

FIG. 6 shows operation of a WS STA in each channel according to an exemplary embodiment of the present invention.

The frame is transmitted/received through the assigned channel and a point of time to practically perform the communication and the spectrum sensing is based on information about the activity/inactivity duration included in the channel activity information.

The WS STA1 610 assigned with the channel A transmits/receives the frame in the activity duration, but senses the assigned channel A in the inactivity duration. Similarly, the WS STA2 650 assigned with the channel B senses the assigned channel B in the inactivity duration, but transmits/receives the frame in the activity duration. At this time, sensing the assigned channel is detecting whether the incumbent user exists (or appears) in the corresponding channel. The WS AP and the WS STA stops occupying the corresponding channel when sensing the signal of the incumbent user in the channel corresponding to the activity duration, and switches the use channel into the corresponding channel of the inactivity duration, thereby transmitting/receiving the frame.

According to an exemplary embodiment of the present invention, the frame can be transmitted/received between the WS AP and the WS STA in the activity duration of each assigned channel. However, a management frame such as the beacon frame is transmitted through the primary channel among the plurality of assigned channels. The primary channel is a channel for transmitting the management frames such as the beacon frame from the WS AP. Therefore, the WS STA assigned with the primary channel among the plurality of WS STAs can receive the beacon frame periodically, but the WS STA assigned with other channels (hereinafter, referred to as a 'secondary channel') may not receive the beacon frame. However, because the multi-channel activity information and the operation channel assignment information can be transmitted through the beacon frame, the STAs operating in the secondary channel also have to receive the beacon frame by regarding the secondary channel as the operation channel.

To this end, the WS STA operating in the secondary channel receives the beacon frame through the primary channel at a point of time when the beacon frame is transmitted, and switches to the secondary channel, where it operated, after completely receiving the beacon frame, thereby transmitting/receiving the frame through its operation channel and performing the spectrum sensing.

Figure 7:
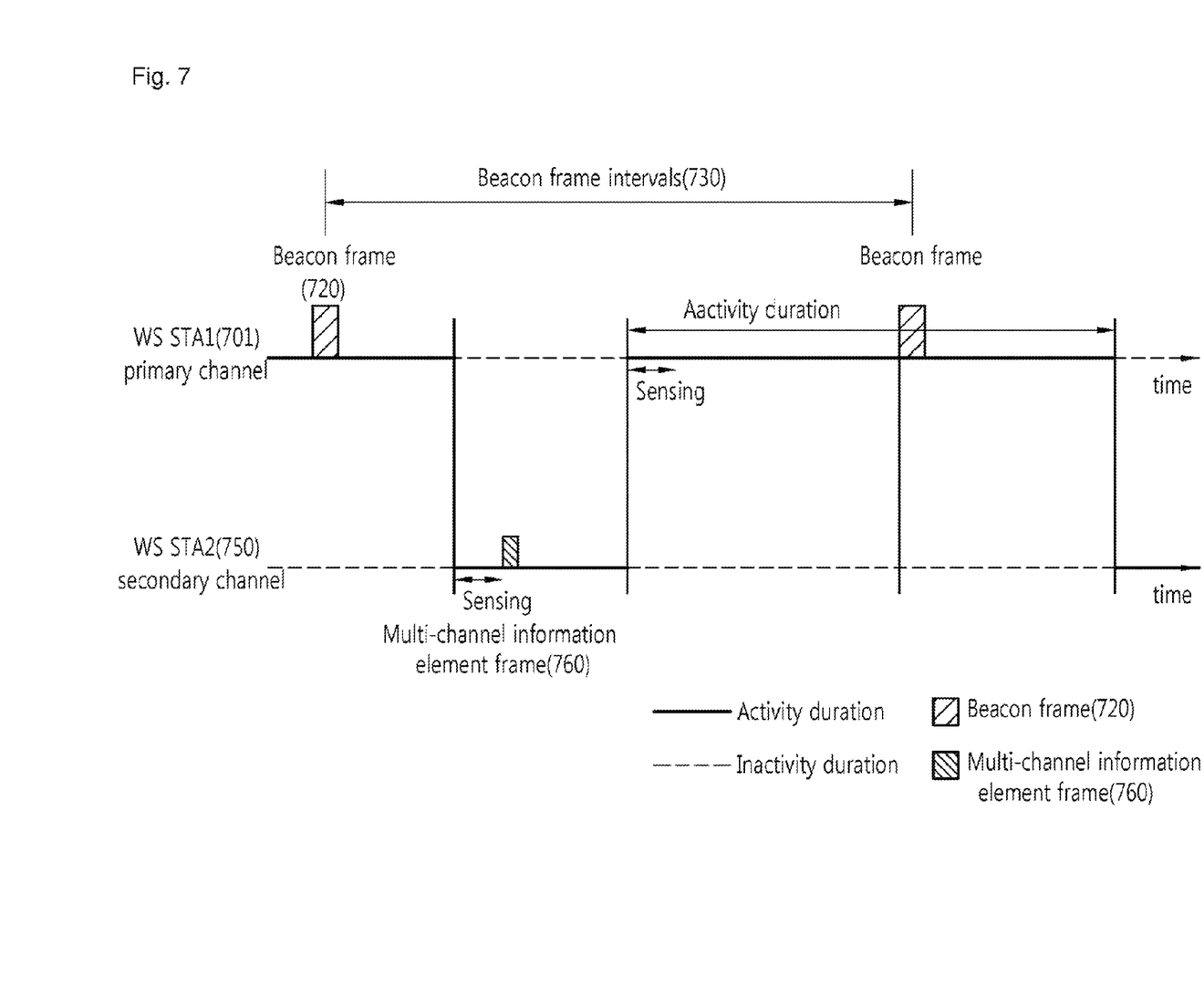
FIG. 7 shows an example of multi-channel operation and a transmission method of the multi-channel information element in the WS AP according to another exemplary embodiment of the present invention.

FIG. 7 shows an example of multi-channel operation and a transmission method of the multi-channel information element in the WS AP according to another exemplary embodiment of the present invention.

The WS STA assigned with the secondary channel may receive the changed channel activity information of the WS AP through the secondary channel. The WS STA1 710 can periodically receive the beacon frame 720 at beacon frame intervals 730 since it is assigned with the primary channel, and receive the changed information when the channel activity information is changed. On the other hand, the WS STA2 750 cannot receive the beacon frame 720 since it is assigned with the secondary channel. Therefore, to enable the WS STA operating in the secondary channel to receive the changed channel activity information, the WS AP separately transmits multi-channel information element frame 760 containing the channel activity information. In this case, the multi-channel information element frame 760 may contain the foregoing multi-channel information element of FIGS. 4 and 5. The WS STA2 750 employing the secondary channel as the operation channel can acquire the channel activity information by receiving the multi-channel information element frame 760. In the case of switching the channel (from the primary channel to the secondary channel or from the secondary channel to the primary channel), the WS AP may perform the spectrum sensing for a predetermined period before transmitting/receiving the signal through the switched channel.

According to an alternative exemplary embodiment of the present invention, the AP may assign both the primary channel and the secondary channel as the operation channels to a certain WS STA. In this case, the STA assigned with both the primary channel and the secondary channel as the operation channel can communicate the frame with the AP by switching to the active channel on the basis of the activity information of each channel.

According to the quality of service (QoS) in the WS STA, for example if the corresponding WS STA requires service vulnerable to delay, such as transmission of voice data, the WS AP assigns both the primary channel and the secondary channel as the operation channel for this WS STA. Thus, the WS STA can transmit/receive the frame through the primary channel in the duration where the WS AP operates in the primary channel (activity duration of the primary channel), and transmit/receive the frame through the secondary channel in the duration where the WS AP operates in the secondary channel (activity duration of the secondary channel)

Figure 8:
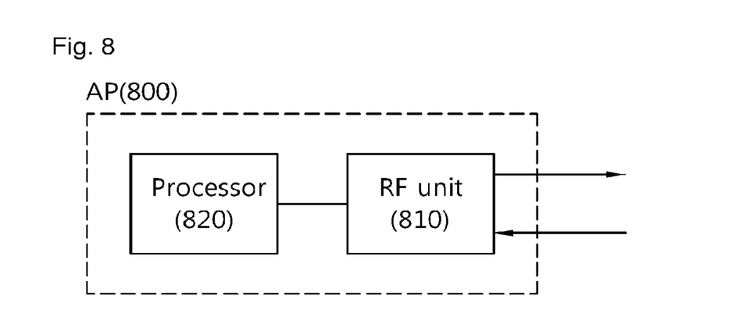
FIG. 8 is a block diagram showing a structure of a wireless apparatus in which an exemplary embodiment of the present invention can be realized.

FIG. 8 is a block diagram showing a structure of a wireless apparatus in which an exemplary embodiment of the present invention can be realized.

Referring to FIG. 8, a wireless apparatus 800 includes a radio frequency (RF) unit 810 and a processor 820. The RF unit 810 receives a frame from an STA accessing an AP 800 and transmits it to the processor 820, and transmits a frame received from the processor 820. The processor 820 is operably connected with the RF unit 810 and is set to generate channel assignment information and channel activity information and transmit the information through the RF unit 810 on the basis of the channel activity information.

The processor 820 and/or the RF unit 810 may include application-specific integrated circuit (ASIC), other chipsets, a logic circuit and/or a data processor. A memory 620 may include a read-only memory (ROM), a random access memory (RAM), a flash memory, a memory card, a storage medium, and/or other storage devices. If the exemplary embodiment is realized by software, the foregoing method may be achieved by a module (procedure, function, etc.) for performing the foregoing functions. The module may be stored in a memory (not shown), and executed by the processor 820. The memory may be internally or externally provided in the processor 820, and connected to the processor 820 by a well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for an access point (AP) operating on at least one operation channel in a wireless local area network (WLAN) system, the method comprising:
   transmitting a beacon frame including operating channel information and channel activity information to a plurality of stations (STAs), the operating channel information indicating at least one of a first channel and a second channel as the at least one operation channel to each of the plurality of STAs;

the channel activity information indicating an activity duration during which the AP can receive a frame through each of the first channel and the second channel; and receiving a frame through the first channel or the second channel on the basis of the channel activity information, wherein the channel activity information includes:
one or more fields for indicating the activity duration, and
a channel indication field including information to distinguish a primary channel from a secondary channel during the active duration.

2. The method of claim 1, wherein the AP transmits a management frame only through the primary channel.

3. The method of claim 1, wherein the first channel and the second channel comprise the secondary channel.

4. A wireless apparatus, comprising:
a radio frequency (RF) unit configured to transmit or receive a frame; and
a processor configured to:
operate while operably connected with the RF unit;
transmit a beacon frame including operating channel information and channel activity information to a plurality of stations (STAs), the operating channel information being for indicating at least one of a first channel and a second channel as the at least one operation channel to each of the plurality of STAs, the channel activity information being for indicating an activity duration where the AP receives a frame through each of the first channel and the second channel; and
receive a frame through the first channel or the second channel based on the channel activity information,
wherein the channel activity information includes:
a channel indication field, and
a channel indication field including information to distinguish a primary channel from a secondary channel during the active duration.

* * * * *